Dec. 1, 1936.  E. A. WEEKS  2,062,544
ROAD SCRAPER AND ROAD SCRAPER ATTACHMENT FOR TRUCKS
Filed Oct. 16, 1935
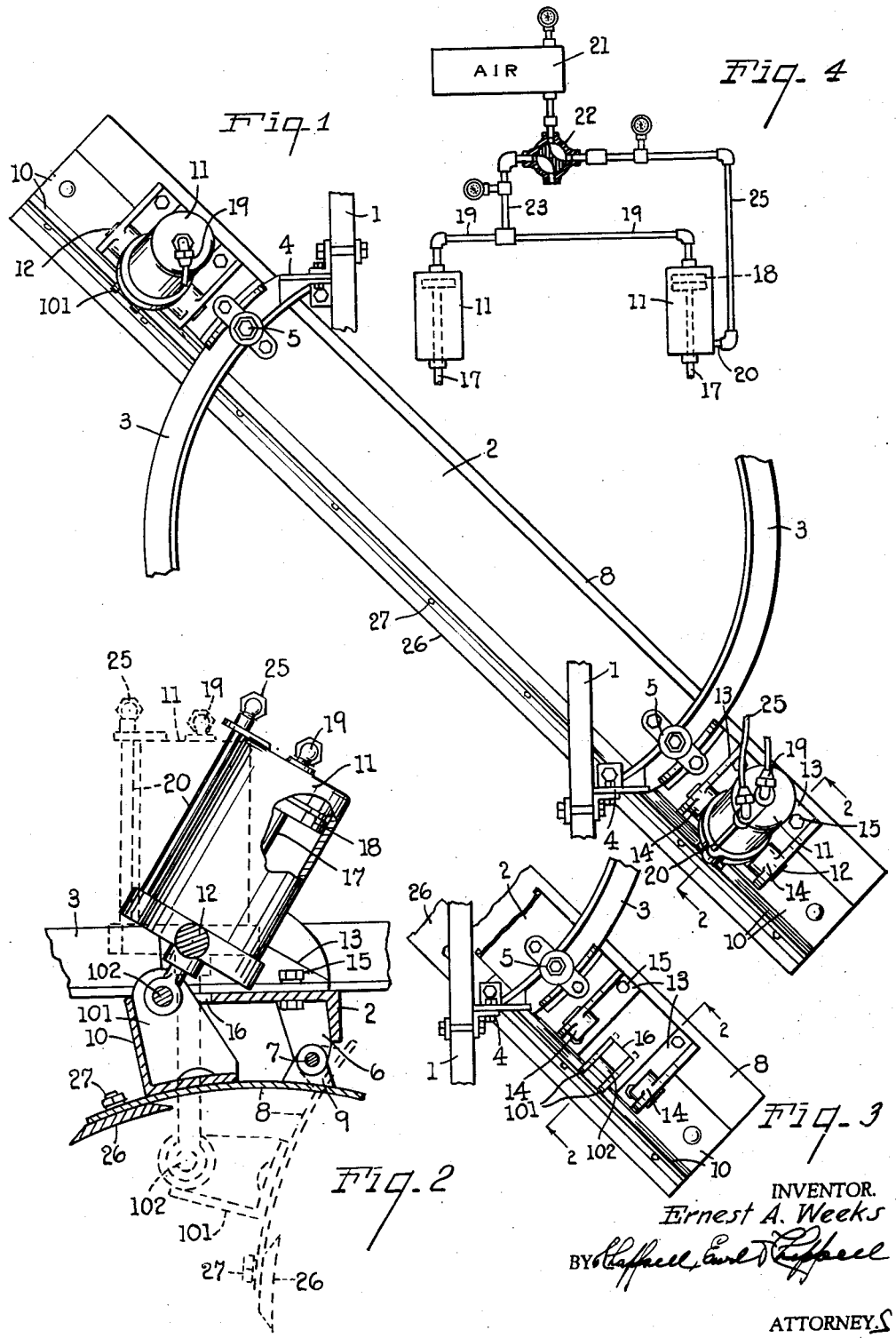
INVENTOR.
Ernest A. Weeks
BY
ATTORNEYS Patented Dec. 1, 1936

2,062,544

UNITED STATES PATENT OFFICE 2,062,544

ROAD SCRAPER AND ROAD SCRAPER ATTACHMENT FOR TRUCKS

Ernest A. Weeks, Kalamazoo, Mich., assignor to Root Spring Scraper Company, Kalamazoo, Mich.

Application October 16, 1935, Serial No. 45,180

7 Claims. (Cl. 37—143)

This invention relates to improvements in road scrapers and road scraper attachments for trucks.

The objects of the invention are:

First, to provide a simple and direct application of pneumatic or hydraulic power.

Second, to provide economical means for supporting a road scraper on the detachable adjustable cross beam of a truck scraper.

Third, to provide an improved mold board scraper in such a combination.

Fourth, to provide improved pneumatic action in which the compressed air is economized and is utilized for the yielding or spring action of the scraper.

Further objects and objects relating to economies of construction and operation will definitely appear from the description to follow.

In the drawing,

Fig. 1 is a plan view of the detachable adjustable cross beam and portions of the truck frame and support necessary to understand the relation of the parts to a truck and truck scraper.

Fig. 2 is an enlarged detail transverse sectional elevation, portions being in full lines on irregular section line 2—2 of Figs. 1 and 3, showing the relation and pivoting of the scraper to the said cross bar and the connection and operation by the pneumatic or power cylinder, the depressed or scraping position being indicated by dotted lines.

Fig. 3 is a detail of the right end part of the structure as seen in Fig. 1 with the pneumatic power cylinder omitted.

Fig. 4 is a diagram of the air or power connections for operating the pneumatic cylinders with the gauges thereon indicated in diagram, in practice the gauges being located on the instrument board of the automobile with connection to the parts indicated, the four-way valve and its connections being shown in cross section.

The parts will be identified by their numerals of reference which are the same in all the views.

1, 1 are the side bars of the frame or chassis of a truck, it not being deemed necessary to illustrate the entire truck. 3, 3 are the curved or segmental side bars carried by the frame secured by means of the adjusting brackets 4, 4. The adjustable beam 2 is secured adjustably by the clamps 5, 5 to the curved segmental bars 3, whereby by the angle of the beam and scraper may be adjusted to the line of draft. The beam and the parts for adjustment are old in the art and I have not attempted to detail the same as they are of the usual construction now brought into this combination.

Toward each end of the beam 2, I provide lugs 6, 6 which receive pivots 7 for the attachment of the mold board 8 of the scraper. This mold board 8 is provided with a pair of lugs 9 cooperating with the lugs 6 and the pivot 7. There is a plurality of pivots, one near each end of the scraper mold board and as many additional ones as are required to effectively and rigidly support the mold board of the scraper. Of the length usually made use of as illustrated in the drawing, one pivot at each end is sufficient.

The mold board 8 is made as light as possible, usually of metal one-fourth of an inch thick and is reinforced by longitudinal bar 10, the ends of which are seen in Figs. 1 and 3, and which is seen in cross section in Fig. 2. It is concealed from view by the beam 2 except at the ends in Fig. 1. On the beam 2 is mounted a pneumatic power cylinder 11 at each end. This reinforcing bar is provided with lug members 101 (see Figs. 2 and 3) for the pivot 102 for attachment of the piston rods of the pneumatic power cylinders 11.

Each cylinder 11 is supported on a trunnion 12 which is carried by bracket 13 having trunnion bearings 14. These brackets are secured in place on the beam 2 by cap screws or bolts 15. The beam 2 is notched at 16, see particularly Figs. 2 and 3, for the accommodation of the piston rod 17 which is connected to the cylinder head 18, see Fig. 2.

The cylinder at the right hand end is made double acting by an air connection 19 at the head and 20 at the bottom; while only a connection 19 is provided at the head of the cylinder at the left hand end of the beam 2.

In Fig. 4, I have indicated diagrammatically the air tank 21 which delivers through the four-way cock 22 and connection 23 to the head ends of both cylinders, thus forcing down both ends of the scraper by the yielding pressure. When the four-way cock is adjusted to the return position as seen in Fig. 4, it admits air under pressure through the connection 25 to the bottom of one of the cylinders which forces the piston 18 of that one cylinder up, which, owing to its connection to the rigid scraper, causes the piston at the left to return it to the initial position without the necessity of air for the return. There is consequently a great saving by making only one cylinder double acting on any scraper when it serves as the return for the scraper. The four-way valve or engine valve permits the return of all pistons that are thus connected. The air tank and the air supply and the air return are each supplied with air gauges located in the plain view of the operator, they preferably being extended to the instrument board of the truck on which my improved scraper is mounted.

It is necessary to provide the truck with the usual air compressor to insure the air supply for operating the scraper that I have illustrated. I desire to state that while I have illustrated the same as pneumatic in action, hydraulic cylinders might be used and have been used with appropriate connection for the power medium in that connection which is usually oil. I have not illustrated this in a hydraulic form because it would be clear to those skilled in the art how it can be done and I desire to claim the pneumatic structure here as the specific means and also broadly power cylinders, no matter how they may be operated, whether pneumatic, steam or hydraulic.

The great advantage of my invention is its simplicity in securing the edge of the mold board by a pivot near the edge of the beam. This saves weight of metal. It is thereby possible to make use of a mold board with the fullest advantage and the same is very compactly folded beneath the truck without the use of heavy rockshafts by properly constructing the mold board of the scraper to secure the necessary rigidity thereof.

I preferably make the mold board 8 of mild steel one-half of an inch thick and provide it with a hardened steel cutter 26 which is adjustably secured thereto by bolts 27, see particularly Fig. 2.

Having thus described my invention, what I claim as new and desire to secure by Letters Patent is:

1. In a truck scraper, the combination of an adjustable channel beam having means for securing it to the frame of a truck, a plurality of pivot lugs at one side thereof, a mold board scraper having corresponding pivoted lugs pivotally connected to the said beam lugs, a reinforcing bar having actuating lugs carried by the said scraper mold board, a plurality of pneumatic cylinders trunnioned to the said beam with their piston rods connected to the actuating lugs on said mold board one of which is double acting, an adjustable cutter bar secured to the said mold board, a source of compressed air, a four-way engine valve connection for connecting to the tops of all of said cylinders for applying yielding pressure to said scraper, and a connection to the bottom of the double acting cylinder for supplying pressure for the return of the said scraper.

2. In a truck scraper, the combination of an adjustable channel beam having means for securing it to the frame of a truck, a plurality of pivot lugs at one side thereof, a mold board scraper having corresponding pivoted lugs pivotally connected to the said beam lugs, a reinforcing bar having actuating lugs carried by the said scraper mold board, a plurality of pneumatic cylinders trunnioned to the said beam with their piston rods connected to the actuating lugs on said mold board, a source of compressed air, a four-way engine valve connection for connecting to the tops of all of said cylinders for applying yielding pressure to said scraper, and a connection to one of said cylinders for supplying pressure for the return of the said scraper.

3. The combination of a channel beam having means for securing it to the frame of a truck, a plurality of pivot lugs at one side thereof, a mold board scraper having corresponding pivoted lugs at its edge pivotally connected to the said beam lugs, and means for applying pressure to said scraper.

4. The combination of a channel beam having means for securing it to the frame of a truck, a plurality of pivot lugs at one side thereof, a mold board scraper having corresponding pivoted lugs at its edge pivotally connected to the said beam lugs, a reinforcing bar having actuating lugs carried by the said scraper mold board, and connections to said reinforcing lugs for applying pressure to said scraper.

5. The combination of a mold board scraper pivoted at its edge, suitable supports therefor, a plurality of pneumatic power cylinders directly connected to actuate the said scraper, means for delivering air to all of said cylinders to force the scraper downwardly with yielding pressure, and means for delivering air to one of said cylinders to return the scraper.

6. The combination of a mold board scraper pivoted at its edge, suitable supports therefor, a plurality of pneumatic power cylinders directly connected to actuate the said scraper, means for delivering air to all of said cylinders to force the scraper downwardly with yielding pressure.

7. The combination of a mold board scraper pivoted at its edge, suitable supports therefor, a power cylinder directly connected to actuate the said scraper, means for delivering air to said cylinder to force the scraper downwardly with yielding pressure.

ERNEST A. WEEKS.